(12) United States Patent
Fjellstad et al.

(10) Patent No.: US 8,897,938 B2
(45) Date of Patent: Nov. 25, 2014

(54) SYSTEM AND METHOD FOR CONTROLLING THE POSITION OF A INSTRUMENT CABLE TOWED IN WATER

(75) Inventors: Ola Erik Fjellstad, Trondheim (NO); Arne Rinnan, Trondheim (NO)

(73) Assignee: Kongsberg Seatex AS, Trondheim (NO)

( * ) Notice: Subject to any disclaimer, the term of this patent is extended or adjusted under 35 U.S.C. 154(b) by 559 days.

(21) Appl. No.: 13/318,269

(22) PCT Filed: Jul. 6, 2010

(86) PCT No.: PCT/NO2010/000268
§ 371 (c)(1),
(2), (4) Date: Dec. 19, 2011

(87) PCT Pub. No.: WO2011/014071
PCT Pub. Date: Feb. 3, 2011

(65) Prior Publication Data
US 2012/0095629 A1    Apr. 19, 2012

(30) Foreign Application Priority Data

Jul. 7, 2009   (NO) .................................. 20092577

(51) Int. Cl.
*G01V 1/38* (2006.01)
*G01V 1/20* (2006.01)

(52) U.S. Cl.
CPC ............. *G01V 1/3826* (2013.01); *G01V 1/201* (2013.01); *G01V 1/3835* (2013.01)
USPC .......................................................... 701/21

(58) Field of Classification Search
USPC ......................................................... 701/21
See application file for complete search history.

(56) References Cited

U.S. PATENT DOCUMENTS

| | | | | |
|---|---|---|---|---|
| 4,033,278 A * | 7/1977 | Waters | ........................... | 114/245 |
| 4,583,206 A * | 4/1986 | Rialan et al. | ..................... | 367/78 |
| 4,635,237 A * | 1/1987 | Benestad et al. | ................ | 367/20 |
| 4,862,422 A * | 8/1989 | Brac | ............................... | 367/19 |
| 5,142,507 A | 8/1992 | Rouquette | | |
| 5,321,668 A * | 6/1994 | Rouquette | ..................... | 367/127 |
| 6,932,017 B1 * | 8/2005 | Hillesund et al. | ............. | 114/244 |
| 7,701,803 B2 * | 4/2010 | Welker | ............................ | 367/17 |
| 2006/0227657 A1 * | 10/2006 | Tveide et al. | .................. | 367/16 |
| 2006/0256654 A1 * | 11/2006 | Paulsen | .......................... | 367/20 |
| 2008/0008032 A1 * | 1/2008 | Welker | ............................ | 367/16 |
| 2008/0008033 A1 * | 1/2008 | Fossum et al. | .................. | 367/16 |
| 2008/0025146 A1 * | 1/2008 | Welker | ............................ | 367/20 |
| 2009/0003125 A1 | 1/2009 | Kusaka et al. | | |
| 2009/0065289 A1 * | 3/2009 | Tenghamn et al. | ............ | 181/112 |
| 2009/0262601 A1 * | 10/2009 | Hillesund et al. | ............... | 367/16 |
| 2009/0279388 A1 * | 11/2009 | Monk et al. | ..................... | 367/21 |

\* cited by examiner

*Primary Examiner* — Shelley Chen
(74) *Attorney, Agent, or Firm* — Ladas & Parry LLP (57) ABSTRACT

System and method for controlling an instrumented cable (30) towed in water, such as a marine seismic streamer and/or an instrumented towed cable array (streamer array), to which at least one instrumented cable (30), control devices (10, 20) are arranged to control the individual instrumented cables (30) both in shape and position in relation to other instrumented cables (30) and then counteract cross currents and/or other dynamic forces affecting a towed cable array behind a seismic survey vessel (50). The wings (12, 23) of the control devices (10, 20) are provided with acoustic transmitter/receiver means (14) and electronics for acoustic ranging, and the vessel (50) and one or more tail buoys (60) are provided with acoustic transmitter/receiver means (62) and electronics for acoustic ranging, and is provided with instrumentation for absolute position and velocity.

25 Claims, 5 Drawing Sheets

SYSTEM AND METHOD FOR CONTROLLING THE POSITION OF A INSTRUMENT CABLE TOWED IN WATER

This application is a 371 of PCT/NO2010/000268, filed on Jul. 6, 2010, which is incorporated herein by reference.

The invention relates to a method for positioning an instrumented cable towed in water, such as a marine seismic streamer and/or an instrumented towed cable array (streamer array) according to the preamble of claim 1.

The invention also relates to a system for positioning an instrumented cable towed in water, such as a marine seismic streamer and/or an instrumented towed cable array (streamer array) according to the preamble of claim 13.

BACKGROUND

A seismic streamer is an elongated cable-like structure (typically up to several thousand meters long), which includes an array of hydrophone cables and associated electric equipment along its length, and which is used in marine seismic survey. In order to perform a 3D/4D seismic survey, a plurality of such instrumented cables is towed behind a survey vessel. Acoustic signals are produced by the seismic sources are directed down through the water and into the seabed beneath, where they are reflected from various strata. The reflected signals are received by the hydrophone cables and then digitalized to build up a representation of the earth strata in the area being surveyed.

The instrumented cables are typically being towed at a constant depth of about five to ten meters to promote removal of undesired "ghost" reflections from the water surface. In order to keep the instrumented cables at a constant depth, control devices known as "birds" are arranged to each instrumented cable at intervals of 200 to 300 meters.

Low frequency depth variations and lateral movement is inevitable. The main reason for cable depth variations are long periodic waves. In general, the worst-case situation occurs when towing in the same direction as the swell. Cable lateral movements are mainly due to sea current components perpendicular to the towing direction. In the case of both swell and cross-current influences, the risk of instrumented cable entanglement is therefore increased.

The cable tension decreases proportionally with the distance from the towing point. Therefore, low frequency lateral and vertical movement tends to have higher amplitudes near closer to the tail. However, the forces acting perpendicular to the instrumented cables are non-uniformly distributed over the length of the cable and will change with time as the towed array moves forward.

During a seismic survey the instrumented cables are intended to remain straight, parallel to each other, equally spaced and at the same depth. However, after deploying the instrumented cables, it is typically necessary for the vessel to cruise in a straight line for at least three cable lengths before the cable distribution approximates this ideal arrangement and the survey can begin. This increases the time it takes to perform a survey, and therefore increases the cost of the survey. However, because of sea currents the instrumented cables fail to accurately follow the path of the seismic survey vessel, sometimes deviating from this path at an angle, known as feathering angle. This can adversely affect the coverage of the survey, frequently requiring that certain parts of the survey to be repeated. In really bad circumstances, the cables can actually become entangled, especially at the end of the instrumented cables, which can cause considerable damage and considerable financial loss.

Several patents cover control devices for instrumented cables, such as marine seismic streamers.

WO 02/059650 A1 describes a system which is characterized in that it includes a command unit and a number of control units, where the control units are located on at least some of the cables and are adapted to measure and report about their positions, that the command unit includes means for receiving position information from each individual control unit and calculation of possible deviations from predetermined positions, and that the system includes means for changing the cable position for re-establishing the positions of the control units.

WO 2005/096018 describes a method and a system which enables seismic survey spread while conducting a seismic survey. The method includes collecting input data, including navigation data for navigation nodes, operating states from sensors associated to spread control elements, environmental data for the survey and survey design data. The positions of the sources and the receivers are estimated using the navigation data, the operating states and the environmental data. Optimum towing tracks for the sources and receivers are determined using the position estimates and a portion of the input data that includes at least the survey design data. Drive commands are calculated for at least two of the spread control elements using the determined optimum towing tracks.

U.S. Pat. No. 6,691,038 B2 describes a method and apparatus including an active control system for a towed seismic cable array that enables relative position control of any number of towed seismic cables. The cable positions are controlled horizontally and vertically using active control units positioned within the seismic array. The three component (x, y, z) position for each cable element, relative to the vessel and relative to each other, is controlled, tracked and stored during a seismic data acquisition run. The active control elements can be located at diverter position, cable head, along the length of the cable or the cable tail. The method enables maneuvering of a seismic array as the towing vessel maintains course or the vessel itself maneuvers to assist the repositioning of the array.

U.S. Pat. No. 6,932,017; U.S. Pat. No. 7,162,967 B2; U.S. Pat. No. 7,222,579 B2 and U.S. Pat. No. 7,293,520 B2 do all describe methods and systems for controlling a cable positioning device arranged to be connected to an instrumented cable (marine seismic streamer) and towed by a seismic survey vessel and which have a wing and a wing motor to change the wing orientation. The method includes step for:—achieving an estimated velocity of the cable positioning device,—to calculate a desired change of wing orientation by using the estimated velocity of the cable positioning device and—to activate the wing motor to produce the desired change of the wing orientation.

From, among others, U.S. Pat. No. 5,443,027, U.S. Pat. No. 6,011,752, U.S. Pat. No. 6,144,342, WO 03/008906 A2, U.S. Pat. No. 6,671,223 B2 U.S. Pat. No. 6,879,542 B2, U.S. Pat. No. 6,459,653, U.S. Pat. No. 5,619,474, U.S. Pat. No. 6,016, 286, U.S. Pat. No. 6,525,992 further control devices and methods for controlling instrumented cables are described.

U.S. Pat. No. 6,691,038 describes an active separation tracking and positioning system for towed seismic arrays.

U.S. Pat. No. 7,190,634 describes a GPS-based underwater cable positioning system.

U.S. Pat. No. 7,376,045 describe a system for determining position of towed marine seismic streamers.

U.S. Pat. No. 7,403,448 describe a streamer steering device orientation determination apparatus and methods.

Control devices according to these embodiments are attended with a number of disadvantages. As control devices (in some of the publications mentioned above) are suspended under the instrumented cable, they produce substantial noise when they are towed through the water. This noise is mixed with the reflected signals detected by the hydrophone cables in the instrumented cables. Some of the control devices include a pair of wings or rudders which are arranged to a rotatable structure encompassing the instrumented cable to generate a lifting force in a specified direction. This is a relatively expensive and complex electromechanical construction which is very vulnerable in subsea operations. Some of the control devices mentioned in the publications above are driven by a pair of wings or rudders in a "bank-to-turn" maneuver; such that the roll angle of the control device is defined from a desired total force. This adds complexity to the local control loop of the total control system and results in bad stability properties as roll angle must be adjusted continuously according to changes in desired total force, particularly induced from the depth control.

Moreover, solutions for performing wireless/contact-less transfer of energy and signals/data between main body and wings is not known, something which will result in a more robust system which is less exposed to functional failure or mechanical failure.

Some control devices which improve these disadvantages are known from the applicant's Norwegian patent 328856 and patent applications NO 20083830 and NO 20063182, and the applicant's application with the title "Control device and method for controlling the position of an instrumented cable towed in water".

OBJECT

The main object of the invention is to provide a method and a system which completely or partly overcomes the disadvantages of the present solutions mentioned above. It is also an object to provide a method which can be used on several types of control devices for instrumented cables, but particularly for use of control devices including three or more wings. It is also an object of the present invention that the system and method shall make the instrumented cable to better withstand affection from uncontrollable forces in the environment around the instrumented cable. It is further an object of the system and method to reduce the power required for controlling. It is further an object of the present invention that it is shall provide opportunities to untwist/untangle twists applied to the instrumented cable. It is an object of the present invention that it shall allow faster course change operations and shorter finishing of operations, and shorter run-ins after line-turns and other operations to an approximately ideal position. An object of the invention is to provide a system and a method which can handle different fault situations/conditions which may arise, including taking into consideration the condition of the control devices.

An object of the present invention is that the system shall be capable of setting a lateral control force of the control device or the instrumented cable without disturbing the local roll and depth control loops of the control device, which run in parallel.

THE INVENTION

A method according to the invention is stated in claim 1. Advantageous features and details of the method are described in claims 2-12.

A system according to the invention is stated in claim 13. Advantageous features and details of the system are described in claims 14-21.

A system for positioning of an instrumented cable towed in water, such as a marine seismic streamer and/or an instrumented towed cable array (streamer array) according to the invention includes one or more control devices arranged to instrumented cables, a control/command central arranged onboard a vessel, preferably an survey vessel, said control/command central being arranged for communication with the one or more instrumented cables and the separate control devices arranged thereto. This is often referred to as a STAP system (STAP—"Seismic Towed Array Positioning"). Moreover, the system includes tail buoys arranged to the instrumented cables in the cable array, and deflector devices to spread the instrumented cables in a cable array. Moreover, the control/command central is arranged to communicate with tail buoys either via the instrumented cable or wirelessly, and is arranged to communicate with the vessel and optionally deflector devices.

The control devices arranged to the instrumented cable(s) are preferably a control device including:

a main body provided with a processor unit, accelerometers, optionally rate gyro and magnetic compass, pressure sensor, and inductive connections for wireless/contact-less communication and energy transfer to wings or mechanical connections for communication and energy transfer, wings, preferably three wings, said wings being provided with a processing unit, inductive connection or mechanical connection for connection to the main body, Hall effect sensor, rechargeable batteries, intelligent charging electronics, motor with momentum sensor; or motor and drive gear housing, preferably three motor with drive gear housings, said motor and drive gear housings being provided with wings, said motor and drive gear housings being provided with a processor unit, inductive connection or mechanical connection for connecting to the main body, hall effect sensor, rechargeable batteries, intelligent charging electronics, motor with momentum sensor, where at least one of the wings of the control device is provided with transmitter/receiver elements and electronics for acoustic ranging, local control device software executing on the body's processor unit, local wing controller software executing on the wing's processor unit.

Control devices like this is described in, e.g. the applicant's Norwegian patent NO 328856 and patent application 20083830, public available on Jul. 9, 2009, and the applicant's at the same time filed patent application with the title "Control device and method for positioning of an instrumented cable towed in water".

That means that the control devices are formed of a main body and at least three wings, so-called smart wings, or at least three motor and drive gear housings provided with wings. The term smart wing is used to illustrate that wing, power supply (batteries), processor unit, motor with momentum sensor, intelligent charging electronics, and hall effect sensor are integrated into the one and same unit, said wing being adapted to be detachably connected to the main body in a simple manner. The alternative which includes motor and drive gear housings is used to illustrate that power supply (batteries), processor unit, motor with momentum sensor, intelligent charging electronics and hall effect sensor, are integrated into the one and same unit, denoted as an motor and drive gear housing which again is provided with a wing, said motor and drive gear housings and wing forming a detachable unit which in a simple manner can be attached to and detached from the main body.

The main body is preferably elongate and substantially elongated tubular and is at its end provided with mechanical and electrical connection means to be connected in series between two adjacent sections of an instrumented cable. Moreover, the main body is at adapted locations provided with fastening and connection means for smart wings or motor and drive gear housing provided with wings, said main body being adapted to the respective alternatives. The control device can in addition be provided with wireless/contact-less or mechanical connection for transfer of communication and/ or energy, and wireless/contact-less communication with external units, e.g. for calibration. With intelligent wings as described above having their own battery supply, it is possible to control the wings to neutral even though the main body is out of function. The batteries in the wings are charged continuously during normal operation and may operate autonomously for several days without energy supply. The wings may also supply energy to the main body if the energy supply through the instrumented cables is cut off.

As mentioned above, the control device and accordingly the instrumented cable or cable array is controlled by means of a control/command central on board of a vessel, said control/command central is provided with software/algorithms and/or means for this. Moreover, the control/command central includes communication means for communication with the instrumented cables, control devices, tail buoys, the vessel and optionally deflector devices. Preferably, the vessel, one or more tail buoys (and optionally one or more deflector devices) are provided with means to receive acoustic signals/ pulses which are transmitted from the control devices for use in ranging and relative and absolute positioning.

The control of an instrumented cable or cable array may be divided in local and global control. The local control is the one performed locally at each control device, while the global control is the control which is performed through the control/ command central and may be considered as a superior control.

The local control makes use of measurements from the control device, such as depth from the pressure sensor; roll angle and roll rate from the accelerometers, optionally rate gyro and magnetic compass; wing deflection from the hall effect sensor and motor control pulses; battery capacity from intelligent charging electronics; motor momentum; and distance to adjacent control devices from an acoustic ranging system.

Moreover, the local controlling makes use of local estimation of the velocity of the control device through water based on a combination of wing motor momentum and wing deflection measurements.

Moreover, the local controlling includes one or more of the following features:

local closed loop roll angle control based on estimated roll angle and roll rate, where the roll angle reference is determined by desired lateral force and operation mode of the wings, local closed loop depth regulation, based on measurements from a local depth sensor (pressure sensor in the main body) and a global depth reference, local lateral force control based upon the dragon principle, gain scheduling of roll controller and depth controller based on information about velocity through water, preferably estimated locally based on the sensors of the control device itself, alternatively updates from the control/command central on the vessel through the instrumented cable, local closed loop roll rate control based on estimated roll rate, local untwist algorithm based on that if static commanded momentum exceeds a certain level over a certain period of time, the control device rolls a certain number of degrees in opposite direction to reduce the static commanded momentum, local detection of instability in roll angle and automatic stabilization, which includes that one at instability in roll angle successively reduces lateral and vertical force until stability in roll angle is re-established, local detection of instability in roll rate and automatic stabilization, which includes that one at instability in roll rate first reset all wings, next activates the roll rate controller with reference rate equal 0, and as the roll movement is stopped, activates roll angle controller and successively increasing lateral and vertical force after also roll angle stability has been achieved, local power saving mode, including reduced energy lateral control and reduced energy depth control, which occur in cases where faults in power supply through the instrumented cable arise or the battery level in the wings are low, automatic dry/wet mode, whereby the control device itself detects whether it is in air or water based on a combination of standard deviation in measured depth and absolute measure depth, and/or state modes which depend on number of wings which are operative, and these modes determine which operations it is possible to perform.

Said state modes are for example: normal, reduced, minimum and disconnected. I normal mode the control device is fully operational and all operations are available. Should a wind not be operative, the control device is in reduced mode, and in this mode all control is available except lateral force control. If two wings are inoperative, the control device is in minimum mode, and in this mode all control except lateral force control and local closed loop depth control is available. If no wings are operative the control device is in disconnected mode, i.e. the wings cannot be manipulated.

The global control makes use of information from the control devices, the instrumented cable and information from tail buoys, vessels and optionally deflector devices, said information being one or more of: navigational data from vessel, tail buoys and/or deflector devices, and information about acoustic ranging and ID; information from a survey schedule, such as position and heading over a ground reference, and depth reference and desired configuration of the cable array (for example parallel instrumented cables or maximum spread); information from control devices and instrumented cable, such as:

status, including condition of the control devices, communication, energy, wing deflection, roll angle and roll rate, locally estimated velocity through water, depth, heading, acoustic ranging and ID, motor momentum, and/or roll momentum and vertical force.

The global control includes one or more of the following features:

activation and collection of acoustic ranging, relative position and velocity determination of control devices in a cable array, based on the results from the acoustic ranging, absolute position and velocity determination of control devices in a cable array, commanding horizontal force references to all control devices on all instrumented cables, including commands based on position-Cross-Track-Error, where position-Cross-Track-Error is found by comparing the absolute position(s) with an absolute reference, adjusting the horizontal force references, which includes adjustment based on the respective control device condition (health), including wing at saturation, and/or includes adjustment to compensate for errors in adjacent control devices on the same instrumented cable, and/or based on cross-track-velocity, controlling deployment and retrieving of instrumented cables, which is performed by the control/command central, which may be provided with individual modes for this, calibration of the control device depth sensors based on measurements of absolute pressure, time synchronization including synchronization of the control device's local clocks in relation to a global reference given by the control/command central, overriding a local untwist algorithm, which involves that an operator on the vessel manually may override the automatic local untwist algorithm when required or desire in the control/command central, overriding dry/wet mode, which involves that an operator manually may override the automatic wet/dry mode when needed or desired in the control/command central,
and/or overriding energy saving mode, which includes that an operator manually may override automatic local energy saving mode when needed or desired in the control/command central.

Activation and collection of acoustic ranging to adjacent control devices, in-line (along the same instrumented cable) and neighbouring cables (all information globally) is performed by the control/command central. Acoustic ranging is performed by means of the acoustic means arranged in the wings of the control devices, and in one or more tail buoys, the vessel and optionally one or more deflector devices. This is performed by configuring each control device of the instrumented cable(s) to transmit on one of y channels and configure each control device on the instrumented cable(s) to receive on all y channels. Then an instrumented cable is selected and its control devices are configured to transmit on channel 1, channel 2, . . . , channel y, channel 1 . . . successively along the selected instrumented cable, whereas all control devices on all the other instrumented cables within a cable array are commanded to receive signals/pulses. The control devices report ID and distances for signals/pulses received within a given period of time to the control/command central on interrogation, whereby the control devices on different instrumented cables preferably transmit simultaneously to limit the time it takes to report all measured distances within the cable array. After all control devices on the selected instrumented cable have completed the transmission, the control devices of next instrumented cable are commanded for transmission, whereas the control devices on the first selected instrumented cable are commanded to receive.

To determine absolute position and velocity of control devices in a cable array, absolute position and velocity of at least two locations in the relative position network is required, which for example is the vessel and one or more tail buoys. The vessel and buoys are in this regard as mentioned above also provided with transmitter/receiver elements in the same manner as the control devices to be able to receive signals/pulses which are transmitted from the control devices, in addition to instrumentation for absolute position and velocity, e.g. GPS. Absolute position and velocity determination of control devices within a cable array is also performed by the control/command central and is based on the results from relative positions and velocities and navigational data from vessels and tail buoys.

The controlling strategy in the control devices is not based on a standard two wing "bank-to-turn" manoeuvre, but the commanded lift is provided through a suitable combination of at least three wings controlled locally according to predefined control actions in the control devices, as described above as local control. The predefined operating functions correspond to command actions from the control/command central. The transition between the operations is controlled locally on the control devices until new commands have been issued from the control/command central. The control device does always return to a standard (default) operation/condition, e.g. depth controlling, at timeout in case of lost communication.

Predefined control actions in the local control circuit can for example be:
  wing deflection—constant wing deflection,
  rate control—constant rate control
  untwist instrumented cable—controlled roll rotation (n revolutions/number of degrees),
  zero momentum,
  zero rate,
  roll control,
  depth control—constant depth control (combined with roll control),
  lateral force—lateral force control (combined with roll and optionally depth control),
  directionally controlled force—directionally controlled force (combined with roll control).

Depth control and lateral force control are examples of conditions including set points for roll control of the instrumented cable and the control device to a predefined roll angle. This reference roll angle depends on the wing distribution of the control device and is chosen to increase the roll control stability in combination with depth control and force control.

In order to obtain a combined automatic control the wings of the control device must operate within limits set by the maximum deflection angle. In the case of automatic control, e.g. with depth control combined with roll control, each control action has the following exemplary priority:
  1. roll control
  2. depth control
  3. force control Pure depth control and depth control combined with lateral force control, either port or starboard, has different predefined roll angle references for control device and instrumented cable. These predefined reference angles are chosen to optimize the roll control robustness, which has been identified as a key factor in control of instrumented cables by using control devices.

Due to limitations in wing deflection angles, the local control actions, which run in parallel, have different priorities, as mentioned above.

The control device can, based on the above mentioned, operate and perform control even though some of the wings have malfunctions, i.e. that the system has a malfunction operating mode. The control device can operate with one or two malfunctioning wings except from:
  lateral force control which requires all three wings, and
  local loop depth control which requires at least two wings.

Depth control can be achieved with only one wing in operation by using directionally controlled force command by using a "bang-bang" depth control strategy in combination with hysteresis.

The predefined local control actions are activated during normal mode when the control device is in the water, called wet mode. At start-up the system is in a dry mode (no automatic control) to ensure safe operation on deck. Wet mode is activated from the control/command central or automatically when the control device is lowered into the sea. The predefined dry/wet mode can for example be:

dry mode—constant wing deflection (standard equal to zero) and no automatic control, wet mode—any commanded action, but returns to zero (for example depth control) at timeout.

As mentioned above, the control devices are arranged to return to default, e.g. depth control in case of wing malfunctioning. In case of power loss the control device will be arranged to continue operation as normal until a predefined low level of buffer battery capacity occurs. For this purpose, energy stored in the buffer batteries in the control device is being used. When a predefined low level for the buffer battery capacity occurs, the control device will as default proceed to neutral, i.e. zero wing deflection and zero momentum.

A method for controlling an instrumented cable or cable array according to the present invention may be summarized in the following steps:

a) Acquire status and information about instrumented cable(s) and control device(s), b) Acquire navigation information for tail buoy(s), vessel and optionally deflector device(s), c) Configuring the control device(s) to transmit and receive acoustic signals/pulses for acoustic ranging, d) Calculating relative and absolute positions, sound velocity and position-Cross-Track-Error and Cross-Track-velocity based on step c), e) Calculate and define settings/set points for control devices based on information from step a)-d), f) Provide the control device(s) with settings/set points, state modes, control commands, g) Repeat steps a)-f) continuously.

Details of the method are explained in detail in the following example description.

By means of the present invention, a method and a system is achieved which increase the robustness in connection with controlling instrumented cables, for example in that reduced operative mode occurs at indication of damaged wings or other functional errors. By means of the system, depth control and/or roll control is maintained in cases where one or more wings have function fault.

Moreover, the invention enable the control devices to be operated both as "bank-to-turn" and that the commanded lift has been provided through a suitable combination of at least three wings controlled locally according to predefined control actions in the control devices.

By using range from a point close to the control device to be controlled, a more accurate calculation of distances and accordingly smaller deviations in measurements which result in a more accurate, robust and less energy demanding control.

Further advantageous details and features of the invention will appear from the following example description.

EXAMPLES

The invention is in the following described in further details with references to the drawings, where.

Figure 1A:
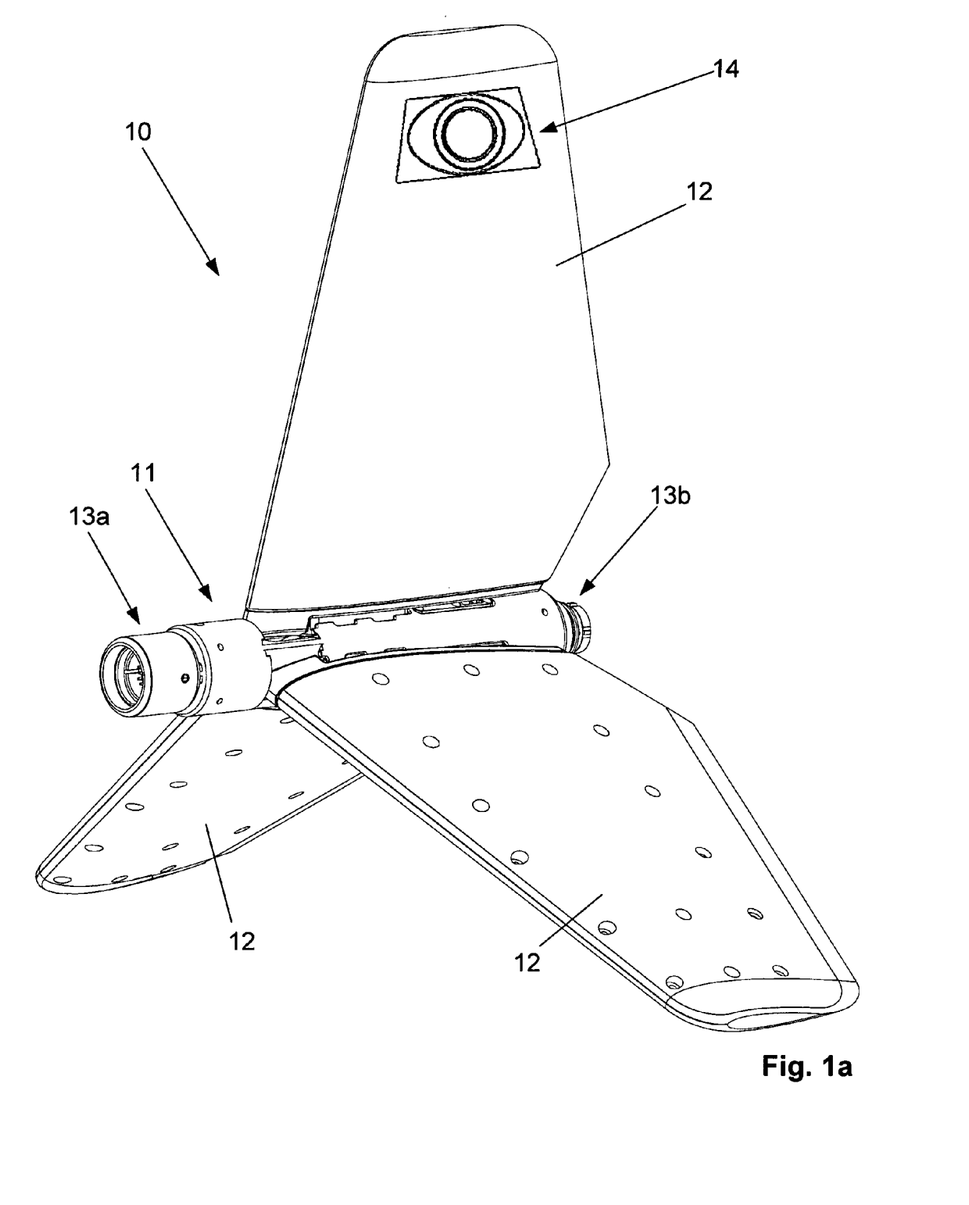
FIG. 1a-b show two different control devices for controlling instrumented cables.
Figure 1B:
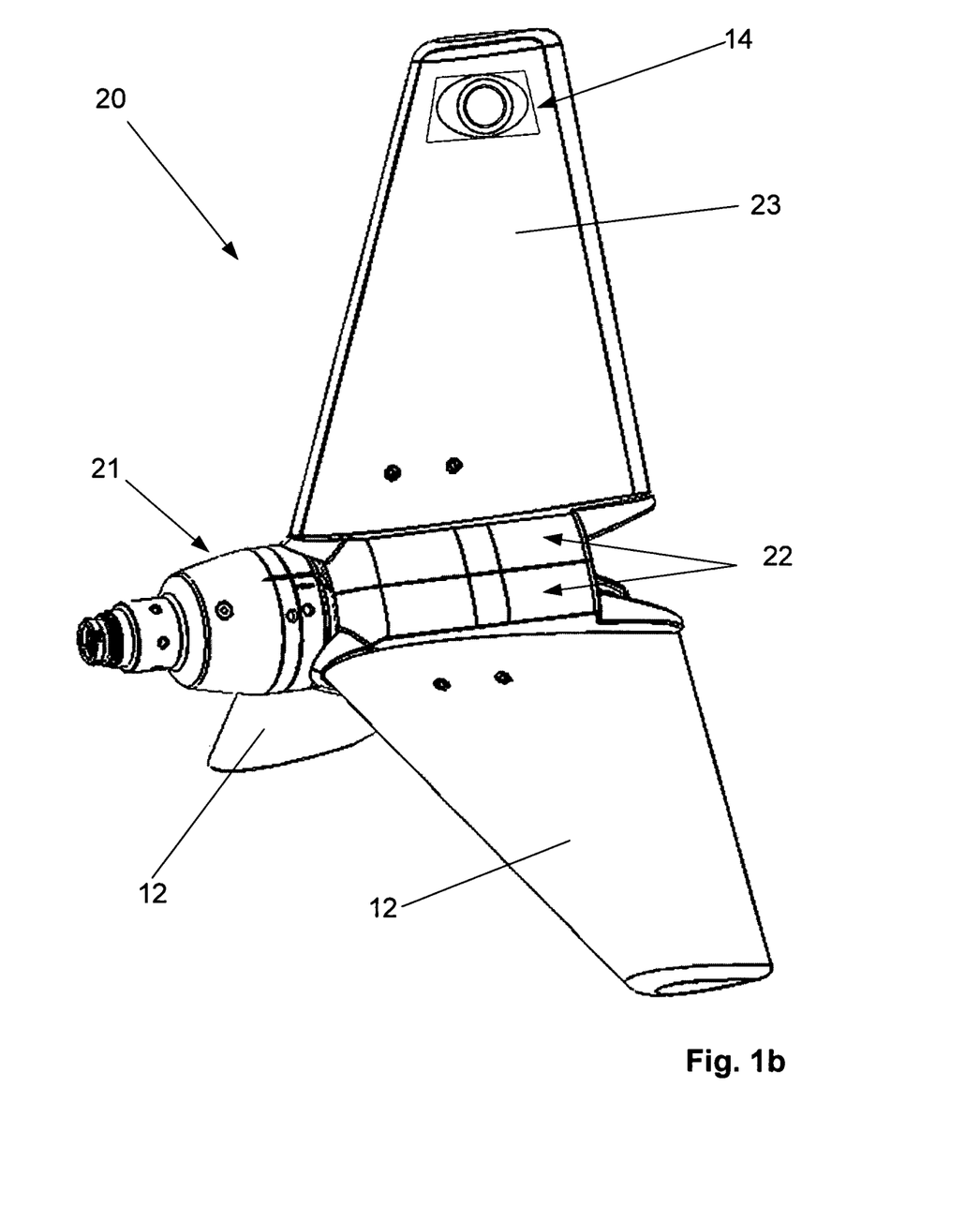

First referring to FIG. 1a-b which illustrate control devices 10, 20 for connection in series between two adjacent instrumented cable sections of a multi-sectional cable, for controlling the instrumented cable. FIG. 1a shows an embodiment where the control device 10 is formed of a main body 11 and three similar wings 12, so-called smart wings, which are evenly distributed about the main body 11, and is a so-called three axis bird. The main body 11 is substantially an elongate streamlined tubular housing, which at its ends includes connection means 13a and 13b adapted for mechanical and electrical connection in series in a multi-sectional seismic instrumented cable of the type being towed behind a seismic survey vessel. The connection means 13a-b are for this purpose adapted to corresponding connection points (not shown) in each end of each cable section, which connection points are normally used for connection of two adjacent cable sections. The wings 12 are further detachably attached to the main body 11.

Moreover, the main body 11 is provided with a processor unit, accelerometers, optionally rate gyro and magnetic compass, pressure sensor and three inductive connectors for wireless communication and energy transfer.

The wings are provided with a processor unit, inductive connection or mechanical connection for connection to the main body for communication and energy transfer, Hall effect sensor, rechargeable buffer batteries, intelligent charging electronics and motor with a momentum sensor.

Moreover, at least one of the wings 12 is provided with a transmitter/receiver element 14 in the form of a transducer, and electronics for acoustic ranging.

Now referring to FIG. 1b which shows a second control device 20 and which is formed of a main body 21 provided with detachable motor and drive gear housings 22 which again is provided with wings 23. The motor and drive gear housings 22 are arranged to be connected to the energy line and power line of the instrumented cable through connectors in the main body 21. Instead of arranging power supply (buffer batteries), processor unit, motor having a momentum sensor, intelligent charging electronics and Hall-effect sensor in a wing 23 as mentioned above, the same integrated in the motor and drive gear housings 22. Also in this embodiment at least one of the wings 23 is provided with a transmitter/receiver element 14 in the form of a transducer, and electronics for acoustic ranging.

The control devices 10, 20 are provided with a local control device software executing on the processor unit at the main body 11, 21, and local wing controller software executing on the processor unit of the wing 12 or motor and drive gear housing 22.

Figure 2:
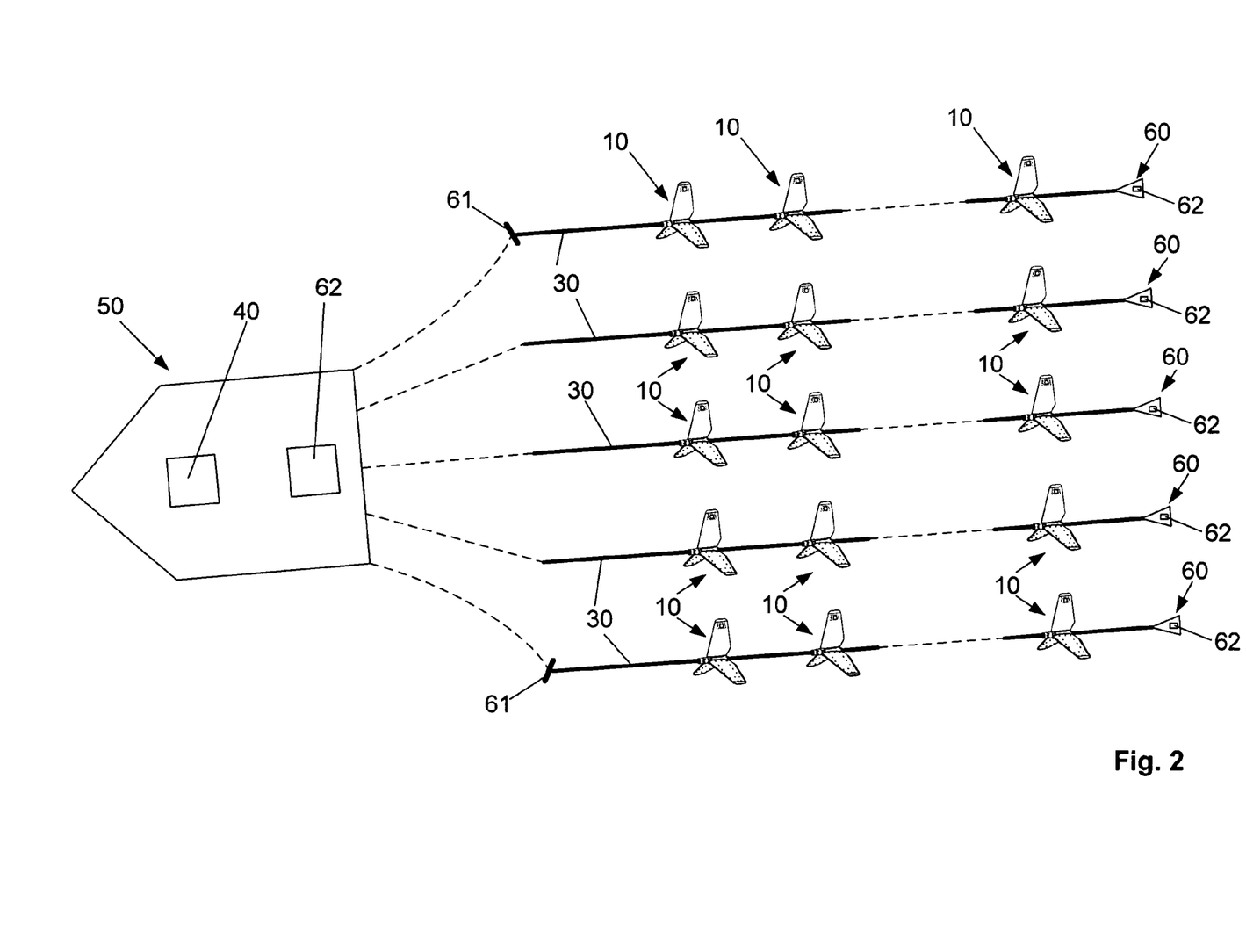
FIG. 2 shows an example of a system according to the invention in operation.

Now referring to FIG. 2, which shows an example of a system according to the invention in use during optimal operating conditions, i.e. no cross currents.

A system for positioning of an instrumented cable towed in water, such as a marine seismic streamer 30, and/or an instrumented towed cable array (streamer array), according to the invention includes one or more such control device 10, 20 (in the figure shown as control devices 10) arranged to an instrumented cable 30, a control/command central 40 arranged onboard a vessel 50 which is controlling the operation, for example a survey vessel, said control/command central 40 being arranged to communicate with the instrumented cable(s) 30 and the respective control devices 10, 20 arranged thereto. This is often referred to as a STAP system (Seismic Towed Array Positioning). Moreover, the system includes tail buoys 60 arranged to the instrumented cables 30 in the cable array, and deflector devices 61 for spreading the instrumented cables 30 in a cable array. Moreover, the tail buoys 60 and vessel 50 are provided with means 62 to receive acoustic signals/pulses transmitted from the control devices 10, 20 for use in ranging and relative and absolute positioning, said means 62 is a transducer and electronics for acoustic ranging, and is provided with instrumentation for absolute positioning and velocity, for example GPS.

The following description is primarily directed to control devices as shown in FIG. 1*a*, but it should be evident that control devices as shown in FIG. 1*b* also can be used, or a combination of these two.

The control of an instrumented cable 30 or cable array can be divided into local and global controlling. The local control is the control which is performed at each control device 10, 20, whereas the global control is the control performed through the control/command central 40.

The local control does typically use measurements from the control device 10, 20 such as depth from the pressure sensor arranged in the main body 11, roll angle and roll rate from accelerometers (not shown) and/or rate gyro and magnet compass (not shown) arranged in the main body 11, wing deflection from Hall-effect sensor (not shown) arranged in wing 12 or motor and drive gear housing 22 and motor controlling pulses; battery capacity from intelligent charging electronics (not shown) arranged in wing 12 or motor and drive gear housing 22; motor momentum from motor (now shown) arranged in wing 12 or motor and drive gear housing 22; distance to adjacent control devices from acoustic ranging system, i.e. information from acoustic means 14 (transducer) in the wing 12, 23.

Moreover, the local control utilizes local estimation of the velocity of the control device 10, 20 through water based on a combination of wing motor momentum and wing deflection measurements.

Moreover, the local controlling includes one or more of the following features:
  Local closed loop roll angle control,
  Local closed loop depth control,
  Local lateral force control,
  Gain scheduling of roll angle controller and depth controller,
  Local closed loop roll rate control based on estimated roll rate,
  Local untwist algorithm,
  Local detection of instability in roll angle and automatic stabilization,
  Local detection of instability in roll rate and automatic stabilization,
  Local energy-saving mode,
  Automatic dry/wet mode,
  State modes.

Local closed loop roll angle control is based on estimated roll angle and roll rate, where roll angle reference is determined by desired lateral force and operation mode of the wings 12, 23. At lateral control, a wing 12, 23 points in opposite direction of desired lateral force. If a fault arises in a wing 12, 23, the wing is set to point downwards.

Local closed loop depth control is based on measurements from the depth sensor of the control devices 10, 20 and a global depth reference given by the control/command central.

Local lateral force control is based on the dragon principle. When the control device 10, 20 provides a lateral force in one direction, the instrumented cable 30 will act as a counter force. If two wings 12, 23 are brought to the same side as desired generated force, the control devices 10, 20 is flown like a dragon, and a maximum stability in roll is achieved. Roll angle is adjusted according to the size of desired force; at complete deflection the roll angle is set to 30 degrees, i.e. a wing 12, 23 is pointing in opposite direction of desired lateral force. Lateral force is preferably ramped up or down to avoid destabilization of roll and depth. Lateral force can also be reduced step less in cases with (low) roll instability.

Gain scheduling of roll controller and depth controller is based on information about the velocity of the control device 10, 20 through water, preferably estimated locally based on the control device's own sensors, alternatively updated by the control/command central 40 at the vessel via the instrumented cable. The wing force is quadratic proportional with the velocity through water, and optimal control must be adapted to this dependency. It is a large advantage that the control devices 10, 20 themselves can estimate the velocity locally because this may vary along the instrumented cable 30. Locally estimated velocity can also be used to improve the position and velocity estimate of the entire instrumented cable 30 in the control/command central 40.

Local closed loop roll rate control based on an estimated roll rate.

Local untwist algorithm is based on that if static commanded momentum exceeds a certain level during a certain period of time, the control device 10, 20 rolls 360 degrees in opposite direction to reduce the static commanded momentum. The control device 10, 20 can also be set to roll in steps of e.g. 120 degrees until static commanded momentum has reached an appropriate low level.

Local detection of instability in roll angle and automatic stabilization results in that one at instability in roll angle, successively reduces lateral and vertical force until stability in roll angle has been re-established. Instability in roll angle is determined from estimated roll angle, i.e. if the difference between the estimated roll angle and the roll angle reference exceeds a certain limit.

Local detection of instability in roll rate and automatic stabilization results in that one at instability in roll rate, initially reset all wings 12, 23, next activates roll rate controller with reference rate similar to zero. As the roll movement has stopped roll angle controller is activated and lateral and vertical force is increased successively after also roll angle stability has been reached. Instability in roll rate is determined from estimated roll rate, i.e. if the absolute value of the roll rate exceeds a certain limit.

Local energy-saving mode is activated in case of malfunction in energy supply through the instrumented cable or low battery level in the wings 12, 23. In energy-saving mode, two wings 12, 23 are held at constant wing deflection whereas the third wing 12, 23 controls roll angle so that the total force is controlled in a desired direction, i.e. combined lateral and vertical force. Hysteresis is preferably used to avoid frequent change of wing deflection of the two wings 12, 23 which are to be kept in position.

Automatic dry/wet mode works in the way that the control device itself 10, 20 detects whether it is in air or water based on a combination of standard deviation of measured depth and absolute measured depth. In dry mode, i.e. when the control device 10, 20 itself is in the air, all automatic controlling is terminated.

Moreover, the control device 10, 20 includes different state modes which are dependent of the number of wings 12, 23 which are operative, and these modes determine which operations it is possible to perform. The state modes are for example: normal, reduced, minimum, disconnected. In the normal mode, the control device 10, 20 is fully operative and all operations are available. If one wing 12, 23 is inoperative, the control device 10, 20 is in reduced mode, and in this mode all controlling except lateral force control is available. If two wings 12, 23 are inoperative the control device 10, 20 is in minimum mode, and in this mode is all controlling is available except lateral force control and local closed loop depth control. In disconnected mode, all automatic operations in the control device 10, 20 are switched off.

The table below summarizes/shows the different state modes and the allowed operations during the different state modes. The different state modes will be based on the number of operative wings 12, 20. This relies upon the fact that the control device 10, 20 will have different properties related to the number of operative wings 12, 23.

TABLE 1

| State mode | # operative wings | Allowed operations |
|---|---|---|
| Normal | 3 | Local closed loop roll angle control, Local closed loop depth control, Local lateral force control, Gain scheduling of roll angle controller and depth controller, Local closed loop roll rate control based on estimated roll rate, Local untwist algorithm, Local detection of instability in roll angle and automatic stabilization, Local detection of instability in roll rate and automatic stabilization, Local energy-saving mode, Automatic dry/wet mode, |
| Reduced | 2 | All operations as for three wings, except local lateral force control, Depth control including roll control requires that non-operating wing points downwards, |
| Minimum | 1 | All operations as for three wings, except local lateral force control and local closed loop depth control, Roll control is performed in the way that the net force points upwards or downwards depending on depth deviation, with hysteresis |
| Disconnected | 0 | No automatic operations/The wings cannot be manipulated. |

If status for a control device 10, 20 indicates that a malfunction has occurred in one or more wings 12, 23, the system and the method of the present invention will automatically align according to the different modes of Table 1. As shown in Table 1, the system includes for example four different modes based on the number of operative wings 12, 23. All operations can be allowed in the normal mode. At only two operative wings 12, 23, the system will enter a reduced mode where operations like depth control including roll control is allowed, whereas one of the wings 12, 23 which is inoperative is set to point downwards. If two wings 12, 23 malfunction so that only one wing 12, 23 is operative, only roll control is allowed. If the wings 12, 23 that malfunction provide a resultant force, roll control can be performed in a way that this force simultaneously is used for depth control. This is achieved in that the net force points upwards or downwards dependent on depth deviation and with an appropriate hysteresis.

In a situation where a control device 12, 20 is totally or partly inoperative, results in that a neighboring control devices 10, 20 is arranged to compensate for the deficiencies of the control device 10, 20 in question. This is done in that the neighboring control devices 10, 20 over control compared to given references for controlling, so that the average control becomes as optimal as possible.

Figure 3:
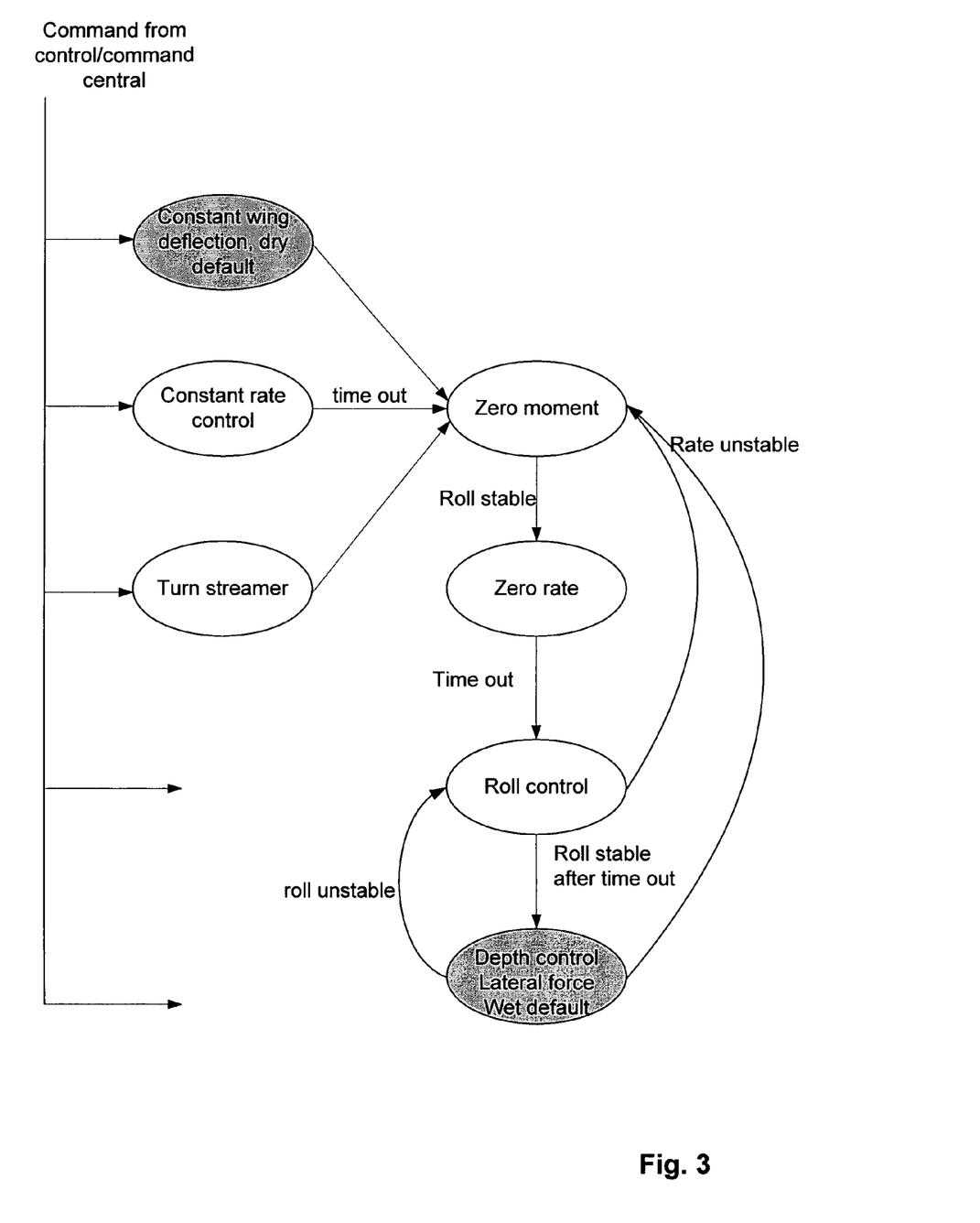
FIG. 3 shows a block diagram for local control.

The controlling strategy in the control devices is not based on a "bank-to-turn" maneuver, but the commanded lift is provided through a suitable combination of at least three wings 12, 23 are controlled locally according to predefined control actions for the control device 10, 20, as shown in FIG. 3. FIG. 3 shows how the transition between actions/states are being controlled locally on the control device 10, 20 based on commanded actions from the control/command central 40, control action stability conditions and a time out function.

The control device 10, 20 always returns to a standard/default state, preferably depth control, in the case of timeout in connection with loss of communication.

In the case of power failure the control device 10, 20 will be arranged to continue normal operation until a low level of buffer battery capacity occur. Energy stored in the buffer batteries in the control device 10, 20 is used for this purpose. When a low level of buffer battery capacity occurs, the control device 10, 20 will by default enter neutral state, i.e. zero wing deflection and zero momentum.

The state modes are based on control commands and cable conditions given from the control/command central 40 onboard the survey vessel 50 which is controlling the operation.

Figure 4:
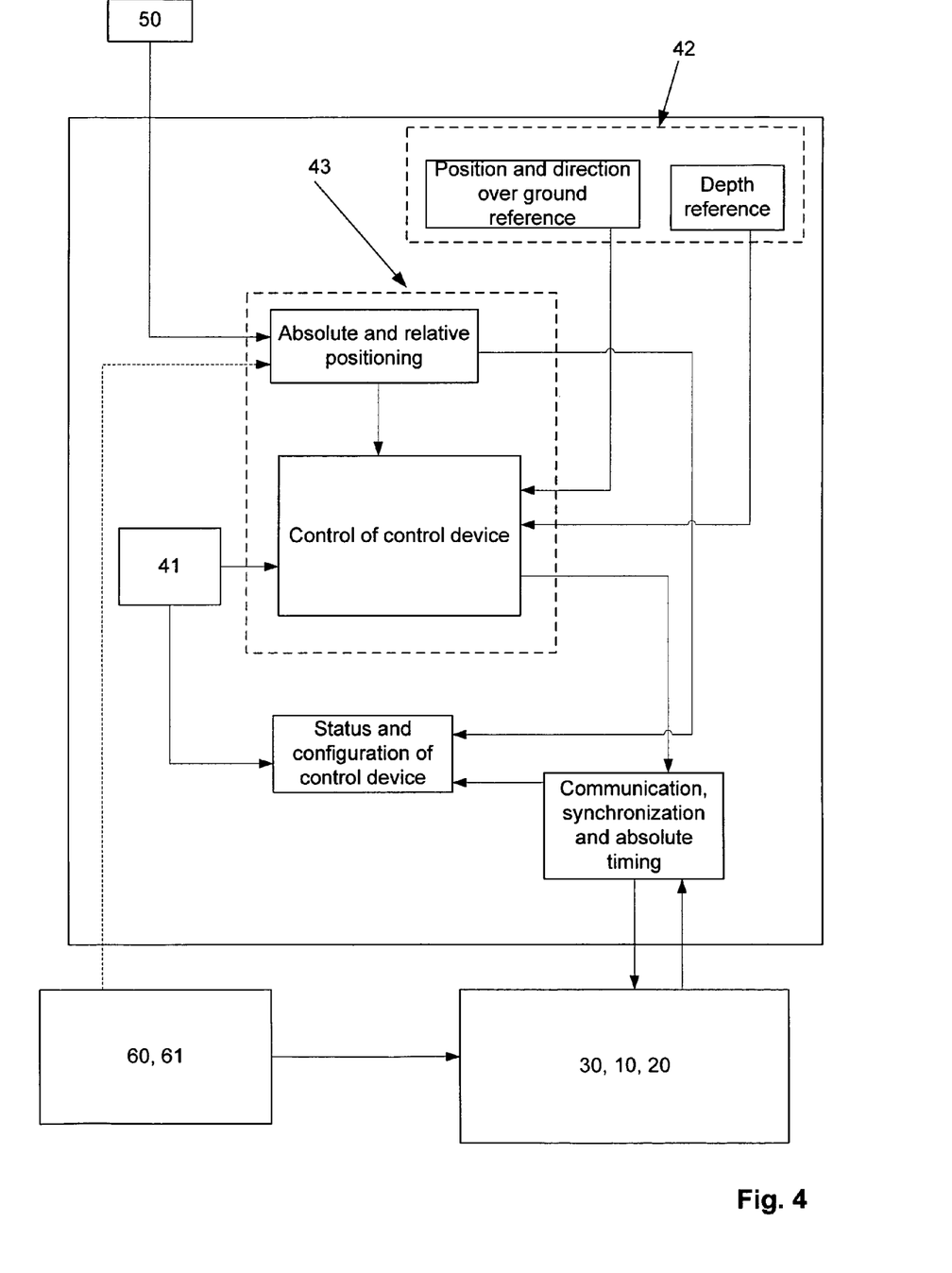
FIG. 4 shows a block diagram for global control.

Reference is now made to FIG. 4 which shows a block scheme of the global control. As mentioned above, the global control is managed by the control/command central 40. The control/command central 40 includes communication means to communicate with the instrumented cables 30 and the control devices 10, 20 arranged thereto, and communication with tail buoys 60 and vessel 50, optionally deflector devices 61. Communication from tail buoys 60 can either be communicated via the communication line of the instrumented cable 30 or via for example radio communication directly with the control/command central 40. Communication with the vessel 50 is performed directly between the control/command central 40 and the vessels systems. Moreover, the communication means are arranged for synchronization and absolute timing for communication from and to the instrumented cables 30/control devices 10, 20.

The control/command central 40 further includes an operator unit 41 for setting and monitoring the system, including manual controlling of the system. Moreover, the system preferably includes a survey schedule 42, which includes information about position and heading over a ground reference, depth reference and desired configuration of the cable array (for example parallel instrumented cables or maximum spread), either as an integrated unit in the control/command central 40 or as an external unit connected thereto.

The control/command central 40 is thus arranged to be provided with one or more of the following information:
Navigational data from vessel 50, tail buoys 60 and/or deflector devices 61.
Information from survey schedule 42 such as position and heading above a ground reference, including depth reference, desired configuration of the cable array (for example parallel instrumented cables of maximum spread),
Information from the controller devices 10, 20 and instrumented cable 30, such as:
Status, including health of the controller devices 10, 20, communication, energy,
Wing deflection,
Roll angle, roll rate,
Local estimated velocity through water,
Depth,
Heading,
Acoustic ranging and ID,
Motor momentum,
Roll momentum and vertical and lateral force.

The control/command central 40 is provided with software/algorithms and/or means, such as a global controller 43 arranged for:
Activating and collecting acoustic range,
Relative position and velocity determination of control devices 10, 20 in a cable array,
Absolute position and velocity determination of the control devices 10, 20 in a cable array,
Commanding horizontal force references to all control devices 10, 20 on all instrumented cables 30,
Adjusting horizontal force references,
Controlling of deployment of and retrieving instrumented cables 30,
Calibrating depth sensors of the control devices 10, 20,
Time synchronization, absolute timing,
Overriding local untwist algorithm,
Overriding dry/wet mode,
Overriding energy-saving mode.

Activating and collecting acoustic ranging to neighboring control devices 10, 20, in-line (along the same instrumented cable 30) and adjacent cables 30 (all information globally) is performed by means of the transducer 14 in the wings 12 of the control devices 10, 20. This is performed by the following method:

c1) Configuring each control device 10, 20 of the instrumented cable(s) 30 to transmit at one of y channels and configuring each control device 10, 20 of the one or more instrumented cable(s) 30 to receive on all y channels, c2) Chose one instrumented cable 30 and configure the control devices 10, 20 on the selected instrumented cable 30 to transmit on channel 1, channel 2 . . . , channel y, channel 1 . . . successively along the selected instrumented cable 30, c3) Commanding all control devices 10, 20 on the selected instrumented cable 30 to transmit pulses/signals at time $T0+X_1S$ through a broadcast message simultaneously to all control devices 10, 20, c4) Commanding all control devices 10, 20 on all other instrumented cables 30 in a cable array to receive signals/pulses with ID after time $T0+X_1S$.

c5) Report ID and distances for signals/pulses received within $T0+X_2S$, where $X_2>X_1$, to the control/command central 40 on request, whereby control devices 10, 20 on different instrumented cables 30 preferably transmit simultaneously to limit the time needed to report all measured distances in the cable array.

c6) After all control devices 10, 20 on the selected instrumented cable 30 have completed the transmission, commanding the control devices 10, 20 of a next chosen instrumented cable 30 for transmission, whereas the control devices 10, 20 of the first selected instrumented cable 30 which has been transmitting is commanded to receive, c7) Repeat steps c1)-c6) for all instrumented cables 30 in a cable array.

Relative position and velocity determination of control devices 10, 20 in a cable array is based on the results from the acoustic ranging above. This is performed by the following method:

d1) Calculating relative positions and sound velocities based on information from ranging, d2) Calculating absolute position in a Kalman filter, arranged in the global controller 43, based on information from step d1), and absolute and relative positions of at least two nodes within the network, preferably the vessel 50 and one or more tail buoys 60, d3) Calculating Cross-Track-Error by comparing the absolute position(s) with an absolute reference, set in the control/command central 40, d4) Calculating Cross-Track velocity from the Kalman filter.

For absolute position and velocity determination of control devices 10, 20 in a cable array, absolute position and velocity at two or more known points in the relative position network is needed, e.g. the vessel 50 and one or more tail buoys 60. The vessel 50 and tail buoys 60 are for this purpose preferably provided with transmitter/receiver elements 62 (transducers) in the same manner as the control devices 10, 20 to be able to receive signals/pulses transmitted from the control devices 10, 20 in addition to instrumentation for absolute positioning and velocity, such as GPS.

On the other hand it is not necessary that the vessel 50 and the one or more tail buoys 60 are provided with transmitter/receiver elements 62, but instead may for example the distance from the vessel 50 to the first control device 10, 20 of an instrumented cable 30 be considered to be constant, and the distance from the last control device 10, 20 of an instrumented cable 30 to the tail buoy 60 can be considered to be constant. In this way it is possible to calculate the two required fixed positions which is needed to calculate relative positions for the entire cable array.

Commanding horizontal force references to all control devices 10, 20 of all instrumented cables 30 are commands based on position Cross Track Error. Position Cross Track error is found by comparing the absolute position(s) with an absolute reference.

Adjustment of horizontal force references for cross-track velocity includes in the principle introduction of a derivate term in the lateral force controller, i.e. PD controlling. The advantage of this is that less lateral force is used if the instrumented cable 30 is moving in correct heading compared to a reference position, and overturn of the position of the instrumented cable 30 is then avoided. The cross-track velocity is found by means of the Kalman filter in the global controller 43.

Adjustment of horizontal force references includes further adjustment based on the state (health) of the respective control device 10, 20, including the wings 12, 23 in saturation. If a control device 10, 20 is using a large portion of its wing deflection for roll or depth control, a too large commanded lateral force may destabilize the system.

Moreover, adjustment of horizontal force references includes adjustment to compensate for errors in adjacent control devices 10, 20 of the same instrumented cable 30.

Control of deployment and retrieving of instrumented cables 30 include that the global controller 43 is provided with its own modes for this, so that deployment and retrieving can be performed in a safe manner to avoid damage on cables 30, control devices 10, 20, vessel 50 and other equipment.

Calibration of the depth sensors of the control device 10, 20 is based on measurements of absolute pressure. The water pressure changes with the air pressure, and there will be a need for adjusting measured water pressure with the variation of air pressure. Normal air pressure often varies between 950-1050 mbar, which corresponds to a depth variation in water of +/−0.5 meters.

Time synchronization includes synchronization of the local clocks in the control devices 10, 20 in relation to a global reference given by the control/command central 40/the global controller 43.

Overriding of local untwist algorithm includes the ability for an operator on the vessel 50 to manually override the automatic local untwist algorithm in the control/command central 40 when needed or desired.

Overriding dry/wet mode includes the ability for an operator on the vessel 50 to manually override automatic dry/wet mode in the control/command central 40 when needed or desired. Overriding energy-saving mode includes the ability for an operator on the vessel 50 to manually override automatic local energy-saving mode in the control/command central 40 when needed or desired.

Table 2 below show examples of controller commands which may be set from the control/command central 40.

TABLE 2

| Controlling commands | Description |
| --- | --- |
| Depth control | Default state. Depth reference from the control/command central. Implicit roll control. Roll references are zero when all wings are intact. |
| Lateral force control | Lateral force reference from the control/command central. Implicit roll and optionally depth control. Roll reference maximally +/−30 degrees. Control/command central command with timeout. |
| Rate control | All wings have same variable wing deflection. Controller command with timeout. |
| Untwisting/take-up of instrumented cable | Automatic state active in the case of cable twist/tangling. Function can be connected/disconnected from the control/command central. |
| Constant wing deflection | One or more of the wings are brought to a specified constant angle. |
| Roll control | Keeps constant roll angle. Roll reference is zero when all wings are intact. |

Different control commands can be constant wing deflection, roll control, depth control, lateral force control, rate control and untwisting/untangling of instrumented cable 30. Constant wing deflection is generally used on deck before the control devices 10, 20 are deployed to test that all wings 12, 23 are functional. Pure roll control is generally used during retrieving of instrumented cable 30. Depth control is default state, which is the one which is usually is used during survey operations where it is desirable to keep the cable array at a certain meters under the surface to avoid disturbance from surface waves and similar to the measurements. At depth control the control devices 10, 20 receive a depth reference from the control/command central 40 which they are operating under.

At lateral force control the control devices 10, 20 are provided with a lateral force reference from the control/command central 40 which they are operating under.

At rate control the control devices 10, 20 are provided with a rate reference, and all wings 12, 23 obtain the same variable deflection determined by local closed loop rate controller.

During untwisting/untangling of an instrumented cable 30, this is a command which is used to untwist/untangle cable sections which have got tangled or twisted. This is a common scenario during survey operations. This is advantageously an automatic active condition which can be set/reset from the control/command central 40. By means of this command, a cable section between two control devices 10, 20 which has become twisted can be untwisted back to its original condition. This avoids unnecessary strain on the cable 30 and control devices 10, 20, and less gain from the control devices 10, 20 is required to control the cable 30 to the desired position as internal forces in the cable 30 due to the twist have no influence. This command may also be run manually by an operator onboard the vessel 50.

Reference is again made to FIG. 3, which also shows control priority of control devices 10, 20. Set points for roll angle, depth and lateral force are defined/set by the control/command central 40 with timeout and operative mode. It has been verified that roll stability is essential both for depth control and lateral force control. For that reason roll control has the highest priority in the local control. Moreover, depth control is more important than lateral force control. Accordingly, depth control has the second highest priority in the local control and lateral force control the lowest priority. As the wings 12, 23 have limited wing deflection, the control devices 10, 20 are arranged with a priority like this 1. Roll control
2. Depth control
3. Force control This means that roll stability always is ensured before depth control or lateral control is performed.

A method for controlling an instrumented cable or cable array according to the invention may be summarized by the following steps:

a) Acquiring status and information about instrumented cable(s) and control device(s), b) Acquiring navigational information for tail buoy(s), vessel and optionally deflector device(s), c) Configuring the control device(s) to transmit and receive acoustic signals/pulses for acoustic ranging, d) Calculating relative and absolute positions, sound velocities, and position Cross-Track-Error and Cross-Track-velocity based on step c), e) Calculating and define settings/set points for control device(s) based on information from steps a)-d), f) Provide the control device(s) with settings/set points, state modes, control commands, g) Repeating steps a)-f).

Step a) includes collecting information about mechanical and electronic error status for instrumented cable(s) 30 and control devices 10, 20, i.e. the health of the control devices 10, 20 (number of operative wings 12, 23, condition of energy and communication), wing deflection, roll angle, roll rate, motor momentum and depth. Included is also local detection of instability in roll angle and local detection of instability in roll rate, and estimation of roll rate.

Step b) includes collection of navigational information from tail buoys 60, vessel 50 and optionally deflector devices 61.

Step c) includes steps c1)-c7) described above, whereas step d) includes steps d1)-d4) described above.

Step e) includes calculating and defining settings/set points for control devices 10, 20 based on information from steps a)-d), by defining state mode, control priority and/or control commands, including setting reference values/settings for local control.

Moreover, step e) includes one or more of the following features:

commanding horizontal force references to all control devices 10, 20 on all instrumented cables 30, based on position Cross-Track-Error, adjusting horizontal force references based on Cross-Track-velocity and/or the condition (health) of the control device, including wings 12, 23 at saturation, adjusting horizontal force references to compensate for errors in neighboring control devices 10, 20 on the same instrumented cable 30, calibrating depth sensors of the control devices 10, 20, controlling deployment and retrieving of instrumented cables 30, synchronizing local clocks of the control devices 10, 20 in relation to a global reference given by the control/command central 40, and/or manually overriding automatic untwist algorithm, overriding automatic local dry/wet mode and/or automatic local energy-saving mode.

Step e) includes control commands such as constant wing deflection, pure roll control, depth control, lateral force control, rate control and untwisting/untangling of instrumented cable 30.

Step f) includes arranging the control devices 10, 20 for one or more of the following features for local control of the control devices 10, 20:
- local closed loop roll rate control based on estimated roll angle and roll rate, where roll angle reference is determined by desired lateral force and operating mode of the wings,
- local closed loop depth control, based on measurements from a local depth sensor (the pressure sensor in the main body) and an global depth reference,
- local lateral force control based on the dragon principle,
- gain scheduling of roll controller and depth controller based on information about velocity through water, preferably estimated locally based on the control device's own sensors and/or updates from the control/command central on the vessel via the instrumented cable,
- local closed loop roll rate control based on estimated roll rate,
- local untwist algorithm, based on that if the static commanded momentum exceeds a certain level during a certain period of time, the control devices rolls a certain number of degrees in opposite direction to reduce the static commanded momentum,
- local detection of instability in roll angle and automatic stabilization, which includes that one at instability in roll angle successively reduces lateral and vertical force until stability in roll angle has been re-established,
- local detection of instability in roll rate and automatic stabilization, which includes that one at instability in roll rate initially reset all wings, next activates roll angle controller with reference rate equal to 0, and as the roll movement is stopped activates roll angle controller and successively increasing literal and vertical force after that also roll angle stability has been achieved,
- local energy-saving mode, including reduced energy lateral control and reduced energy depth control, which occurs in case of power failure through the instrumented cable or low battery level in the wings,
- automatic dry/wet mode, which includes that the control device itself detects whether it is in air or water based on a combination of standard deviation of measured depth and absolute measured depth, and/or
- different state modes which are dependent on the number of wings 12, 23 which are operative, and these modes determine which operations it is possible to perform.

Step c) or f) further includes providing/configuring the control devices 10, 20 with one or more of the following predefined control actions:
- wing deflection—constant wing deflection,
- rate control, constant roll rate control,
- untwist of instrumented cable, controlled roll rotation (n revolutions/number of degrees),
- zero momentum,
- zero rate,
- roll control,
- depth control—constant depth control (combined with roll control),
- lateral force—lateral force control (combined with roll and depth control),
- directionally controlled force—directionally controlled force (combined with roll rate), Moreover, the method includes that the control actions/ control commands are subordinated the following priority:
1. roll control
2. depth control
3. force control Step a), b) or e) includes further collecting information from a survey schedule 42, such as position and heading over a ground reference, and depth reference, desired configuration of the cable array (e.g. parallel instrumented cables or maximum spread).

MODIFICATIONS

Even though the description above is based on acoustic transmitter/receiver elements arranged in the wings of the control devices, they can alternatively be arranged to or integrated with the main body of the control devices or motor and drive gear housing.

The method may include possibilities of fine-tuning depth calibration parameters whereas the control device is arranged on the instrumented cable, where new calibration constants are calculated from old calibration constants, and measurement of depth at the surface and depth estimates in submerged condition. These estimates can have origin from other depth sensors, from vertical force distribution along the instrumented cable or from a QC analysis of seismic data on the way.

The invention claimed is:

1. Method for controlling an instrumented cable towed in water, such as a marine seismic streamer, and/or an instrumented towed cable array (streamer array), to which instrumented cable(s) control devices are arranged for controlling the individual instrumented cables both in shape and position in relation to other instrumented cables and by that counteract crosscurrents and/or other dynamic forces affecting a towed cable array behind a seismic survey vessel, and to which instrumented cable(s) tail buoys and deflector device(s) are arranged, a control/command central being arranged on said vessel for controlling the instrumented cable or cable array, which control/command central is arranged to communicate with the one or more instrumented cable(s) and the vessel includes an operator unit, characterized in that the method includes the following steps:
a) acquiring status and information about instrumented cable(s) and control device(s);
b) acquiring navigational information for tail buoy(s), vessel and optionally deflector device(s), which tail buoy(s) and deflector device(s) are provided with acoustic transmitter/receiver means and electronics for acoustic ranging;
c) configuring the control device(s), which control devices includes at least two wings provided with acoustic transmitter/receiver elements and electronics for direction-controlled measurement of distances between adjacent control devices on parallel towed cables, to transmit and receive acoustic signals/pulses for acoustic ranging, including
  c1) configuring each control device of the instrumented cable(s) to transmit by means of the at least two transmitter/receiver elements simultaneously on one of y channels and configuring each control device of the instrumented cable(s) to receive by means of the transmitter/receiver elements on all y channels,
  c2) chose an instrumented cable and configure the control device(s) on the selected instrumented cable to transmit by means of the at least two transmitter/ receiver elements simultaneously on channel 1, channel 2 . . . , channel y, channel 1 . . . successively along the selected instrumented cable, c3) command all control devices on the selected instrumented cable to transmit pulses/signals by means of the at least two transmitter/receiver elements at time $T0+X_1$ s through a broadcast message simultaneously to all control devices to provide multiple measurement per range per interrogation, c4) command all control devices on all other instrumented cables in a cable array to receive by means of the transmitter/receiver elements signals/pulses with ID after time $T0+X_2$ s, c5) report ID and ranges for signals/pulses with ID received after time $T0+X_2$ s, where $X_2>X_1$, to the control/command central on demand, where control devices on different instrumented cables preferably transmit by means of the at least two transmitter/receiver elements simultaneously to limit the time it takes to report all measured distances in the cable array, c6) after all control devices on the selected instrumented cable have finished transmitting, the control devices of a next selected instrumented cable are commanded for transmission, while the control devices on the first selected instrumented cable which has been transmitting is commanded to receive, c7) repeat steps c1)-c6) for all instrumented cables in a cable array for complete acoustic ranging of the instrumented cables in the cable array;

d) calculating relative and absolute positions, sound velocities between known positions and position Cross-Track-Error and Cross-Track-velocity based on step c);

e) calculating and defining settings for control device(s) based on information from steps a)-d);

f) providing the control devices with settings, state modes, control commands for providing an accurate, robust and less energy demanding control of the cable array;

g) repeat steps a)-f) continuously.

2. Method according to claim 1, characterized in that step d) includes the following steps:
   d1) calculating relative positions and sound velocities based on information from ranging from step c),
   d2) calculate absolute position in a Kalman filter, arranged in the control/command central, based on information from step d1), and absolute and relative positions of at least two nodes in the network, preferably the vessel and one or more tail buoys,
   d3) calculate Cross-Track-Error by comparing the absolute position(s) with an absolute reference, set in the control/command central,
   d4) calculate Cross-Track-velocity from the Kalman filter.

3. Method according to claim 1, characterized in that step e) include calculating and defining settings for control devices based on information from step a)-d), by defining state mode, control priority and/or control commands, and setting reference values/settings for local control.

4. Method according to claim 1, characterized in that step e) includes one or more of the following steps:
   commanding horizontal force references to all control devices on all instrumented cables based on position Cross-Track-Error,
   adjusting horizontal force references based on Cross-Track-velocity and/or the condition (health) of the control devices, including wings in saturation,
   adjusting horizontal force references to compensate for errors in neighboring control devices on same instrumented cable,
   calibrating depth sensors of the control devices,
   controlling deployment and retrieval of instrumented cables,
   synchronizing local clocks of the control devices in relation to a global reference given by the control/command central,
   and/or
   manually overriding automatic local untwist algorithm, overriding automatic local dry/wet mode and/or automatic local energy-saving mode.

5. Method according to claim 1, characterized in that step e) includes control commands as constant wing deflection, pure roll control, depth control, lateral force control, rate control and untwisting/untangling of instrumented cable.

6. Method according to claim 1, characterized in that step f) includes arranging the control devices for one or more of the following features for local control of the control devices:
   local closed loop roll angle control based on roll angle and roll rate, where roll angle reference is determined by desired lateral force and wing operation mode,
   local closed loop depth control based on measurements from a local depth sensor and a global depth reference,
   local lateral force control based on the kite principle,
   gain scheduling of roll controller and depth controller based on information about velocity through water, preferably estimated locally based on measurements from sensors of the control device and/or update from the control/command central on the vessel via the instrumented cable,
   local closed loop roll rate control based on estimated roll rate,
   local untwist algorithm, based on that if static commanded momentum exceeds a certain level during a certain period of time, the control device rolls a certain number of degrees in opposite direction to reduce the static commanded momentum,
   local detection of instability in roll angle and automatic stabilization, which includes that one at instability in roll angle successively reduces lateral and vertical force until stability in roll angle has been reestablished,
   local detection of instability in roll rate and automatic stabilization, which includes that one at instability in roll rate first is resetting all wings, next activates roll rate controller with reference rate equal to 0, and as the roll movement has stopped, activating roll angle controller and successively increasing lateral and vertical force after also roll angle stability has been achieved,
   local energy-saving mode, including reduced energy lateral control and reduced energy depth control, which occur in case of power failure through the instrumented cable or low battery level in the wings,
   automatic dry/wet mode, which includes that the control device itself detects whether it is in air or water based on a combination of standard deviation of measured depth and absolute depth, and/or
   different state modes, which are dependent on the number of wings which are operative, and these modes determine which operations are possible to perform.

7. Method according to claim 1, characterized in that step c) or f) includes the steps of providing/configuring the control devices locally with/for one or more of the following predefined control actions:
   wing deflection—constant wing deflection,
   rate control—constant roll rate control,
   untwisting of instrumented cable—controlled roll rotation (n rotations/number of degrees),
   zero momentum,
   zero rate, roll control,
depth control—constant depth control (combined with roll control),
lateral force—lateral force control (combined with roll and depth control),
directionally controlled force—directionally controlled force (combined with roll control).

8. Method according to claim 1, characterized in that the control actions/control commands are subjected to the following priority:
1. roll control
2. depth control
3. force control.

9. Method according to claim 1, characterized in that step a), b) or e) includes acquiring information from a survey schedule, such as position and heading over a ground reference, and depth reference, desired configuration of the cable array.

10. Method according to claim 7, characterized in that the state modes are:
normal mode where the control device is fully operational and all operations/control actions are available,
reduced mode if one of the wings of the control device is inoperative, in which mode all control except lateral force control is available,
minimum mode if two of the wings of the control device are inoperative, in which mode all control except lateral force control and local closed loop depth control is available, and
disconnected mode in which the control device is powered off.

11. Method according to claim 1, characterized in that the method includes fine tuning of depth calibration parameters while the control device is arranged on the instrumented cable, where new calibration constants are calculated on basis of old calibration constants, and measurements of depth at the surface and depth error estimates in submerged condition.

12. Method according to claim 11, characterized in that the depth error estimates are found from other depth sensors, from vertical force distribution along the instrumented cable or from a QC analysis of seismic data in transit.

13. Method according to claim 1, characterized in that step e) includes processing navigational data and calculating correction data for a magnetic compass of each control device and that step f) includes providing the magnetic compass of each control device with corrected setting for improved accuracy.

14. System for executing the method according to claim 1, where the control devices include:
a main body provided with a processor unit and one or more of: accelerometers, rate gyro, magnetic compass, pressure sensor, and
three or more wings provided with a processor unit, connection to the main body, hall effect sensor, rechargeable batteries, intelligent charging electronics, motor with momentum sensor, or
three or more motor and drive gear housings, which motor and drive gear housings are provided with wings, which motor and drive gear housings are provided a processor unit, connection to the main body, hall effect sensor, rechargeable batteries, intelligent charging electronics, motor with momentum sensor, characterized in that
the control devices are provided with acoustic transmitter/receiver elements and electronics for acoustic ranging in at least two of the wings,
the vessel and one or more tail buoys are provided with acoustic transmitter/receiver means and electronics for acoustic ranging and provided with instrumentation for absolute position and velocity,
where the acoustic transmitter/receiver elements/means in the at least two wings are arranged for direction-controlled measurement of distances between adjacent control devices on parallel towed cables,
the control/command central is provided with means or arranged for:
acquiring status and information about instrumented cable(s) and control device(s), and navigational information for tail buoy(s), vessel and optionally deflector device(s);
configuring the control device(s) to transmit and receive by means of the transmitter/receiver elements in the at least two wings acoustic signals/pulses for acoustic ranging,
calculating relative and absolute positions, sound velocities and position Cross-Track-Error and Cross-Track-velocity based in acquired information,
calculating and defining settings for the control device(s) based on the acquired information and calculated values and provide the control devices with settings, state modes, control commands for providing an accurate, robust and less energy demanding control of the cable array.

15. System according to claim 14, characterized in that one or more acoustic transmitter/receiver elements are arranged in main body or motor and drive gear housing.

16. System according to claim 14, characterized in that main body and wings are provided with inductive connections for wireless/contact-less communication and energy transfer to wings and vice versa, or mechanical connections for communication and energy transfer.

17. System according to claim 14, characterized in that the control devices are provided with local control software/algorithms executing on the processor unit of the main body, and local wing control software/algorithms executing on the processor unit on the wings.

18. System according to claim 14, characterized in that the local software/algorithms of the control device is arranged for one or more of the following features:
local closed loop roll angle control based on estimated roll angle and roll rate, where roll angle reference is determined by desired lateral force and operating mode of the wings,
local closed loop depth control, based on measurements from a local depth sensor and a global depth reference,
local lateral force control based on the kite principle,
gain scheduling of roll controller and depth controller based on information about velocity through water, preferably estimated locally based on sensors of the control device and/or updates from the control/command central on the vessel via the instrumented cable,
local closed loop roll rate control based on estimated roll rate,
local untwist algorithm based on that if static commanded momentum exceeds a certain level over a certain period of time, the control device rolls a certain degrees in the opposite direction reduce the static commanded momentum, local detection of instability of roll angle and automatic stabilization, including that one at instability in roll angle successively are reducing lateral and vertical force until stability in oll angle has been reestablished, local detection of instability in roll rate and automatic stabilization, which includes that one at instability in roll rate reset all wings, next activates roll rate controller with reference equal to 0, and as the roll movement has been stopped activates roll angle controller and successively increasing lateral and vertical force after also stability in roll angle has been achieved, local energy saving mode, including reduced energy lateral control and reduced energy depth control, which occurs in case of power failure through the instrumented cable or low battery level in the wings, automatic dry/wet mode, whereby the control device itself detects whether it is in air or water based on a combination of standard deviation of measured depth and absolute measured depth, and/or different state modes which are dependent on number of operative wings, and these modes determine the operations which are possible to perform.

19. System according to claim 14, characterized in that the local lateral force controller of the control device is provided with a derivative term for adjustment of horizontal force references for Cross-Track-Velocity.

20. System according to claim 14, characterized in that the control/command central is provided with a Kalman filter for absolute positioning.

21. System according to claim 14, characterized in that the control/command central is provided with software/algorithms and/or provided with means, such as a global controller arranged for one or more of the following features:

activating and collection of acoustic ranging, relative position and velocity determination of control devices in a cable array, absolute position and velocity determination of control devices in a cable array, commanding horizontal force references to all control devices on all instrumented cables, adjusting horizontal force references, controlling and deploying and retrieving of instrumented cables, calibrating depth sensors of the control devices, communication, time synchronization and absolute timing with the one or more instrumented cable(s), overriding local untwist algorithm, overriding dry/wet mode, overriding energy saving mode.

22. System according to claim 14, characterized in that the control/command central is arranged for communication with an operator unit for setting and monitoring the system, and manual control of the system, and/or a survey schedule for acquiring information about position and heading over a ground reference, depth reference and desired configuration of the cable array.

23. System according to claim 14, characterized in that the control device is arranged to provide the local control device software with measurements, as depth from the pressure sensor, roll angle and roll rate from the accelerometers, optionally rate gyro and magnetic compass, wing deflection from the hall effect sensor and motor control pulses; battery capacity from intelligent charging electronics; motor momentum; and distance to neighboring control devices from acoustic ranging.

24. System according to claim 14, characterized in that the local control device software makes use of local estimation of the velocity of the control device through water based on a combination of wing motor momentum and wing deflection measurements.

25. System according to claim 14, characterized in that the control/command central is provided with information from the control devices, the one or more instrumented cable(s), and information from tail buoys, vessel and optionally deflector devices, which information being one or more of:

navigational data from vessel, tail buoys and/or deflector devices, and information about acoustic ringing and ID, information from control devices and instrumented cable(s), such as:

status, including condition of the control devices, communication, energy, wing deflection, roll angle and roll rate, locally estimated velocity through water, depth, heading, acoustic ranging and ID, motor momentum, and/or roll momentum and vertical and lateral force.

* * * * *